United States Patent

[11] 3,594,109

[72] Inventor Robert Noel Penny
 Solihull, England
[21] Appl. No. 837,280
[22] Filed June 27, 1969
[45] Patented July 20, 1971
[73] Assignee Leyland Gas Turbines Limited
 Solihull, England
[32] Priority July 27, 1968
[33] Great Britain
[31] 35974/68

[54] FLAME TUBE
 2 Claims, 2 Drawing Figs.
[52] U.S. Cl. .................................................. 431/352,
 60/39.65
[51] Int. Cl. ........................................................ F23d 15/02
[50] Field of Search .......................................... 60/39.65;
 431/352

[56] References Cited
UNITED STATES PATENTS
3,064,424 11/1962 Tomlinson ..................... 60/39.65
FOREIGN PATENTS
624,939 6/1949 Great Britain ................. 60/39.65

Primary Examiner—Carroll B. Dority, Jr.
Attorney—Mawhinney & Mawhinney

ABSTRACT: A frame tube for a gas turbine combustion chamber including at least one annular linear of a ceramiclike, refractory or other heat and flame resistant material positioned within a metallic outer wall, said liner having apertures therein in registration with holes in said metallic wall, and a plurality of bushes inserted into the holes in the metallic wall and through the registering apertures in said liner, the bushes being a loose fit in the apertures and being secured to the metallic wall to hold said liner from circumferential and axial movement within the flame tube except for limited movements necessary to permit thermal expansion and contraction of the metallic wall relatively to said liner.

PATENTED JUL20 1971

3,594,109

INVENTOR
ROBERT NOEL PENNY

FLAME TUBE

The invention relates to a flame tube for a combustion chamber of a gas turbine engine or a combustion chamber and is particularly concerned with a flame tube capable of operation at a very high temperature e.g., of the order of 1100° C. to 4000° C.

A conventional metal flame tube is not suitable for continuous operation at such high temperatures and therefore investigation has been made into the feasibility of lining a metallic flame tube with a ceramiclike refractory or other heat or flame resistant material e.g. silicon nitride. An object of the invention is to solve the problem of satisfactorily securing the lining to the metallic flame tube and to allow for thermal expansion and contraction of the latter relatively to the lining.

According to the invention, a flame tube comprises a metallic annular wall provided with holes for the introduction of air into the interior of the flame tube, at least one annular liner of a ceramiclike, refractory or other heat or flame resistant material, the or each liner having apertures therein in registration with the holes in the flame tube, and a plurality of bushes arranged to be inserted into the holes in the flame tube and through the registering apertures in the liner or liners, the bushes being a loose fit in the apertures and being secured to the metallic wall, thereby to hold the liner or liners from circumferential and axial movement within the flame tube except for limited movements necessary to permit thermal expansion and contraction of the metallic wall relatively to the liner or liners.

The apertures in the or each liner may be holes of similar shape to the holes in the metallic wall or they may be formed by notches in adjacent edges of two axially adjacent liners, said notches cooperating in pairs to define apertures equivalent to holes of similar shape to the holes in the metallic wall.

The bushes are preferably made of metal and are secured by welding or an equivalent process to the metallic wall after insertion of the bushes into the holes in the metallic wall and into the apertures in the liner or liners.

This manner of securing liners within metallic flame tube walls may be applied to flame tubes of the cylindrical or "can" type to be inserted in individual cylindrical combustion chamber casings or to each of a plurality of circumferentially spaced flame tubes arranged within a common annular combustion chamber casing. Similarly annular inner and outer liners may be attached in like manner to corresponding annular metallic walls of an annular flame tube or combustion chamber.

The invention also includes a combustion chamber containing at least one flame tube constructed in accordance with any one of the immediately preceding four paragraphs.

A flame tube in accordance with the invention is now described by way of example with reference to the accompanying drawing, in which.

Figure 1:
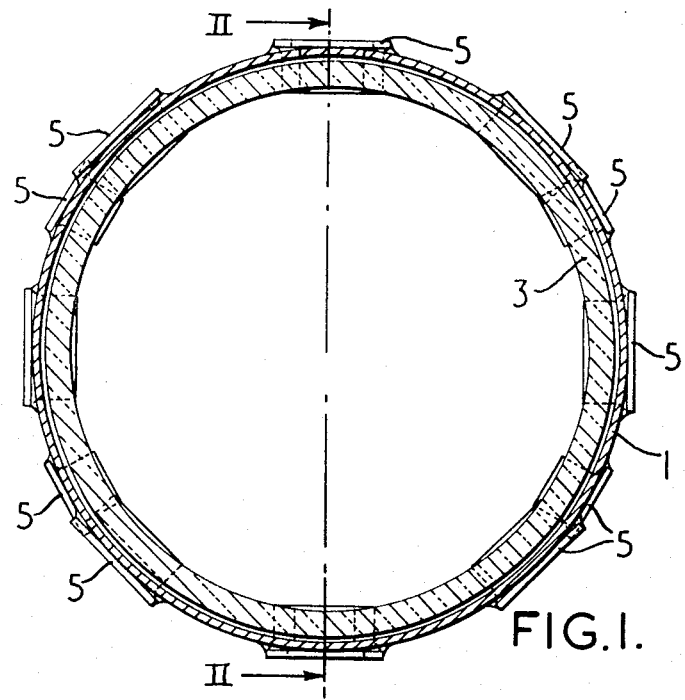
FIG. 1 is an end view of the flame tube.
Figure 2:
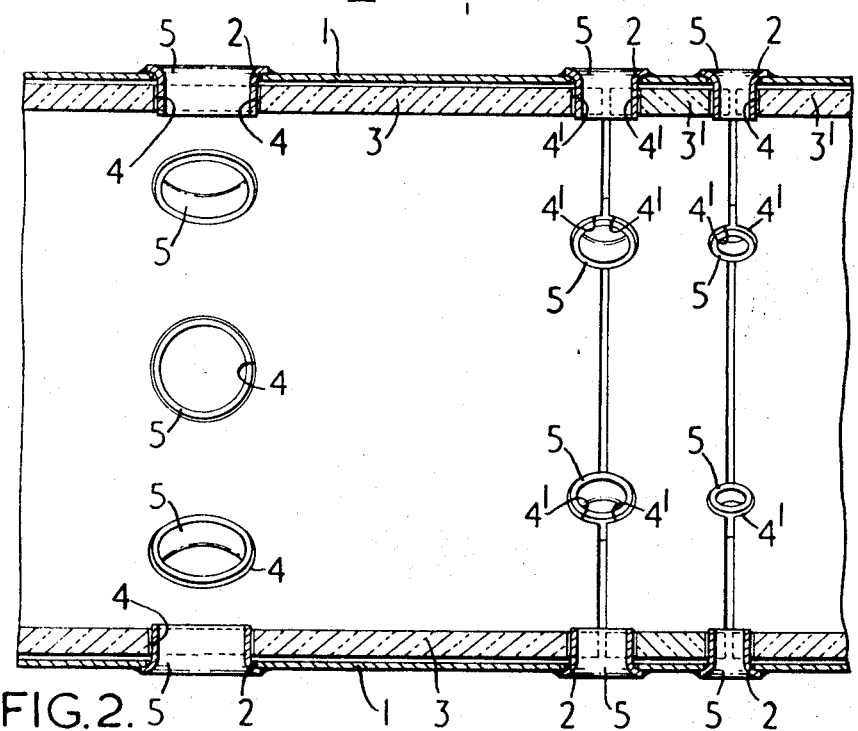
FIG. 2 is an axial section on the line II–II in FIG. 1 and shows two alternative constructions of annular liner.

The flame tube which is of the cylindrical or "can" type comprises a cylindrical metallic wall 1 similar to any conventional "can" type of flame tube. For example, the wall 1 may be constructed from a single cylindrical portion, as shown, or from a plurality of cylindrical wall portions partially overlapping and radially spaced one within another to provide passages for the introduction into the flame tube of cooling air. The metallic wall 1 is provided with a plurality of holes 2 for the introduction into the flame tube of air, as is well known in conventional flame tubes. As provided by the present invention, the metallic wall 1 has inserted axially into it an annular liner 3, or several axially arranged liners 3', of a ceramiclike, refractory material, such as silicon nitride. The outer diameter of the or each liner 3 or 3' is such that the liner is a loose fit within the wall 1 so as to permit the latter to expand and contract relatively to the liner. Apertures are formed in the liner or liners 3 or 3' and are arranged so as to register with the holes 2 in the wall 1. The apertures may be holes 4 formed in the liner 3 and of similar shape to the holes 2 in the flame tube 1, as shown at the left-hand end of FIG. 2. Alternatively, as shown at the right-hand end of FIG. 2, each pair of axially adjacent liners 3' are provided with apertures formed by notches 4' in their adjacent end edges, the notches 4' being so aligned in pairs as to be equivalent to holes. After the liner or liners 3 or 3' have been inserted into the metallic wall 1, they are secured therein by inserting a flanged bush 5 into each hole 2 in the metallic wall 1 and into the hole 4, or pair of aligned notches 4', in register with the hole in the wall 1. The bushes 5 are also made of metal and are welded to the metallic wall 1 after they have been fitted; but the bushes 5 make a loose fit in the holes 4, or pairs of aligned notches 4', in the liner or liners 3 or 3'. Thus the bushes 5 will hold the liner or liners 3 or 3' from circumferential and axial movement within the metallic wall 1 except for permitting the latter to expand and contract relatively to the liner or liners 3 or 3', as the latter have a considerably lower coefficient of expansion than the metallic wall 1. The bushes 5 define passages for air to be introduced into the flame tube.

Although the flame tube illustrated is of the cylindrical or "can" type, the illustrated manner of securing a liner or liners such as 3 or 3' can be applied to inner and outer metallic walls of an annular flame tube or combustion chamber.

I claim:

1. A flame tube, for a gas turbine combustion chamber, comprising a metallic annular wall provided with holes for the introduction of air into the interior of the flame tube wherein the improvement comprises two annular liners of a refractory material positioned in adjacent axial alignment within said annular wall, said liners having notches in their adjacent circumferential edges, said notches cooperating in pairs to define apertures in registration with said holes in said annular wall, said flame tube also including a plurality of bushes inserted into said holes in said annular wall and through the registering apertures in said liners, said bushes having a loose fit in said apertures and being secured to said annular wall to hold said liners from circumferential and axial movement within said annular wall except for limited movements due to thermal expansion and contraction of said annular wall relatively to said liners.

2. A flame tube as claimed in claim 1 in which said bushes are made of metal and are secured by welding to said metallic wall after insertion of said bushes into said holes in said metallic wall and into the apertures in said liners.